Patented Jan. 30, 1940

2,188,776

UNITED STATES PATENT OFFICE 2,188,776

DYESTUFFS OF THE ANTHRAQUINONE SERIES

Ralph N. Lulek, Milwaukee, Wis., assignor to E. I. du Pont de Nemours & Company, Wilmington, Del., a corporation of Delaware No Drawing. Application April 14, 1938, Serial No. 201,935

2 Claims. (Cl. 260—316)

This invention relates to the preparation of a new and valuable dyestuff of the anthraquinone series, more particularly to the preparation of a dyestuff of the anthrimidecarbazole type which dyes cotton in desirable dark red-brown shades and which will possess the good fastness properties of that class of dyestuffs.

In Example 8 of German Patent 566,708 there is described the preparation of a dyestuff by the ring-closure of 4',4''-dibenzoylamino-1',1'',1,5-trianthrimides at 80 to 100° C. with approximately 5 parts of aluminum chloride. This ring-closed product dyes cotton in brownish red shades of good fastness properties. It is too light in shade, however, for use as a component in the production of dark maroons and dark browns of deep bluish brown hues and since a color in the brown range must be suitable for mixing with known colors to give these desirable shades, attempts have been made to produce a dark brown dyestuff in this same class.

It is therefore an object of this invention to produce a brown dyestuff of the series commonly known as the anthrimidecarbazoles which will dye cotton in deep red brown shades, and which is suitable as a self-dyeing color and for use in mixtures with known colors to give dark maroon and dark brown shades.

I have found that by altering the conditions under which the 4',4''-dibenzoylamino-1',1'',1,5-trianthrimide of the formula:

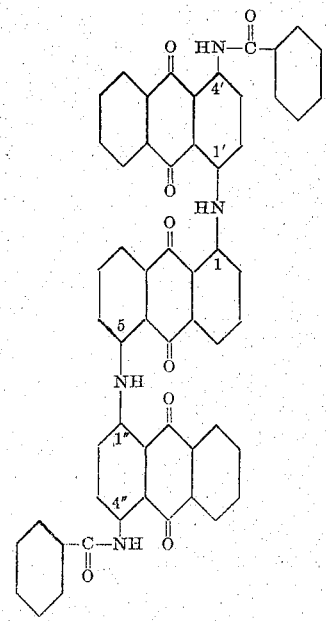

is ring-closed with aluminum chloride a new and valuable dark red-brown dyestuff can be produced which is particularly suitable for use in the preparation of mixtures to give maroon and deep dark brown dyestuffs. This new dyestuff is obtained when the ring-closure of the dibenzoylaminotrianthrimide is carried out under more mild conditions than those disclosed for the preparation of the color in Example 8 of German Patent 566,708. By "more mild conditions" I mean the use of less aluminum chloride and/or lower temperatures. The reaction is preferably carried out without isolation of the intermediate anthrimide from the nitrobenzene solution in which the anthrimide is formed. The trianthrimide is prepared by the condensation of two molecular parts of 1-benzoylamino-4-chloroanthraquinone with one molecular part of 1,5-diaminoanthraquinone in nitrobenzene and in the presence of an acid binding agent and a copper catalyst. When the ring-closure is carried out in the same nitrobenzene solution in which the anthrimide is formed, from 2¼ to 4½ parts of aluminum chloride, based on the trianthrimide compound, should be used. With this range in quantity of aluminum chloride, the temperature at which the reaction should be carried out to give the desired dyestuff will be from 65 to 100° C. If the larger quantities of aluminum chloride, such as 4½ parts, are employed the temperature should not be above 65 to 80° C. If only 2¼ parts of aluminum chloride are used the temperature should be maintained between 95 and 100° C. With intermediate amounts of aluminum chloride, the intermediate temperatures should be used. The difference in color of the dyestuff obtained by this modified reaction over that obtained by the process of Example 8 or German Patent 566,708 is entirely unexpected and could not be predicted from any disclosure found in that patent or in the prior art known to applicant.

The following example is given to illustrate a preferred process by which this color may be produced.

Example 80 parts 1,5-diaminoanthraquinone are heated with 244 parts 1-benzoylamino-4-chloroanthraquinone, 60 parts soda ash, and 4 parts cuprous chloride in 1600 parts nitrobenzene to reflux temperature, for eight hours. The condensation mass is then cooled to room temperature and 969 parts aluminum chloride are added in portions over a period of one hour, permitting the temperature to rise to 60° C. When the addition of the aluminum chloride is completed the charge is heated to 90° C. and held at this temperature for one hour. After cooling to room temperature the charge is drowned in ice water and the nitrobenzene removed by steam distillation.

The dyestuff is filtered, washed, and dried. It may be converted into a paste by dissolving in concentrated sulfuric acid and drowning the acid solution in ice water. The dry dyestuff is a dark brown powder soluble in concentrated sulfuric acid with red coloration and dyes cotton from a dark red vat in bluish dark brown shades of excellent fastness properties.

I claim:

1. The new anthrimide-carbazole type vat dyestuff which dissolves in concentrated sulfuric acid with a red color and dyes cotton from a dark red vat in bluish dark brown shades of excellent fastness properties, said dyestuff being substantially identical in color with the dyestuff obtained by the aluminum chloride ring-closure of the 4',4''-dibenzoylamino-1,1': 5,1''-trianthrimide in nitrobenzene, at a temperature of 90° C., with 3¼ parts of aluminum chloride per part of trianthrimide, said dyestuff being obtained by the aluminum chloride ring-closure of 4',4''-dibenzoylamino-1,1': 5,1''-trianthrimide in nitrobenzene, the amount of aluminum chloride being within the range of from 2¼ to 4½ parts per part of trianthrimide and the reaction being carried out at temperatures within the range of from 65 to 100° C.

2. The process for preparing a new bluish dark brown vat dyestuff of the anthrimide-carbazole type which comprises reacting the 4',4'' - dibenzoylamino-1,1': 5,1'' - trianthrimide with aluminum chloride in nitrobenzene under conditions sufficiently mild to give a dyestuff of substantially the same color as that dye obtained by heating 4',4''-dibenzoylamino-1,1': 5,1''-trianthrimide in nitro benzene at a temperature of 90° C. with 3¼ parts of aluminum chloride per part of trianthrimide, the amount of aluminum chloride employed being within the range of 2¼ to 4½ parts per part of anthrimide contained in the reaction mass and the temperature of fusion being between 65 and 100° C.

RALPH N. LULEK.